United States Patent [19]

Corbo et al.

[11] Patent Number: 4,911,964

[45] Date of Patent: Mar. 27, 1990

[54] EXTERIOR WEATHER BARRIER FOR WINDOWS AND DOORS

[75] Inventors: Thomas A. Corbo, University Heights; S. Thomas Carrozza, Westlake, both of Ohio

[73] Assignee: Manco, Inc., Cleveland, Ohio

[21] Appl. No.: 60,977

[22] Filed: Jun. 19, 1987

Related U.S. Application Data

[63] Continuation of Ser. No. 870,156, Jun. 3, 1986, abandoned.

[51] Int. Cl.$^4$ .................................................. B32B 7/06

[52] U.S. Cl. ........................................ 428/40; 428/212; 428/214; 428/354

[58] Field of Search ................. 428/40, 354, 212, 214; 427/208

[56] References Cited

U.S. PATENT DOCUMENTS 4,273,827 6/1981 Sweeney et al. ............... 427/208 X
4,582,737 4/1986 Torgerson et al. ............. 427/208 X

*Primary Examiner*—Alexander S. Thomas
*Attorney, Agent, or Firm*—Body, Vickers & Daniels

[57] ABSTRACT

A stretchable thin plastic film and a double faces adhesive tape are mountable on exterior surfaces surrounding a building window or door to provide an external weather barrier. One side of the adhesive tape is adapted for mounting on a wide variety of external mounting surfaces at temperatures as low as 40° F., and the plastic film is mountable on the adhesive on the other side of the tape at the same low temperature. The two adhesives have different adhesion strengths which enable the adhesive tape to be adhered to the mounting surface without separation therefrom during the stretching and adhering of the plastic film to the opposite side thereof and which adhesion strengths, with the film so stretched and adhered, provide for the film to be maintained against separation from the adhesive tape and the adhesive tape maintained against separation from the mounting surfaces under adverse weather conditions including gusting winds, rain and temperatures at least as low as 0° F. for a period of at least six months. The plastic film has sufficient memory to enable it to return to a taut, wrinkle free disposition fillowing distension of the film by the impingement of wind and rain thereagainst.

22 Claims, 1 Drawing Sheet

FIG. 1
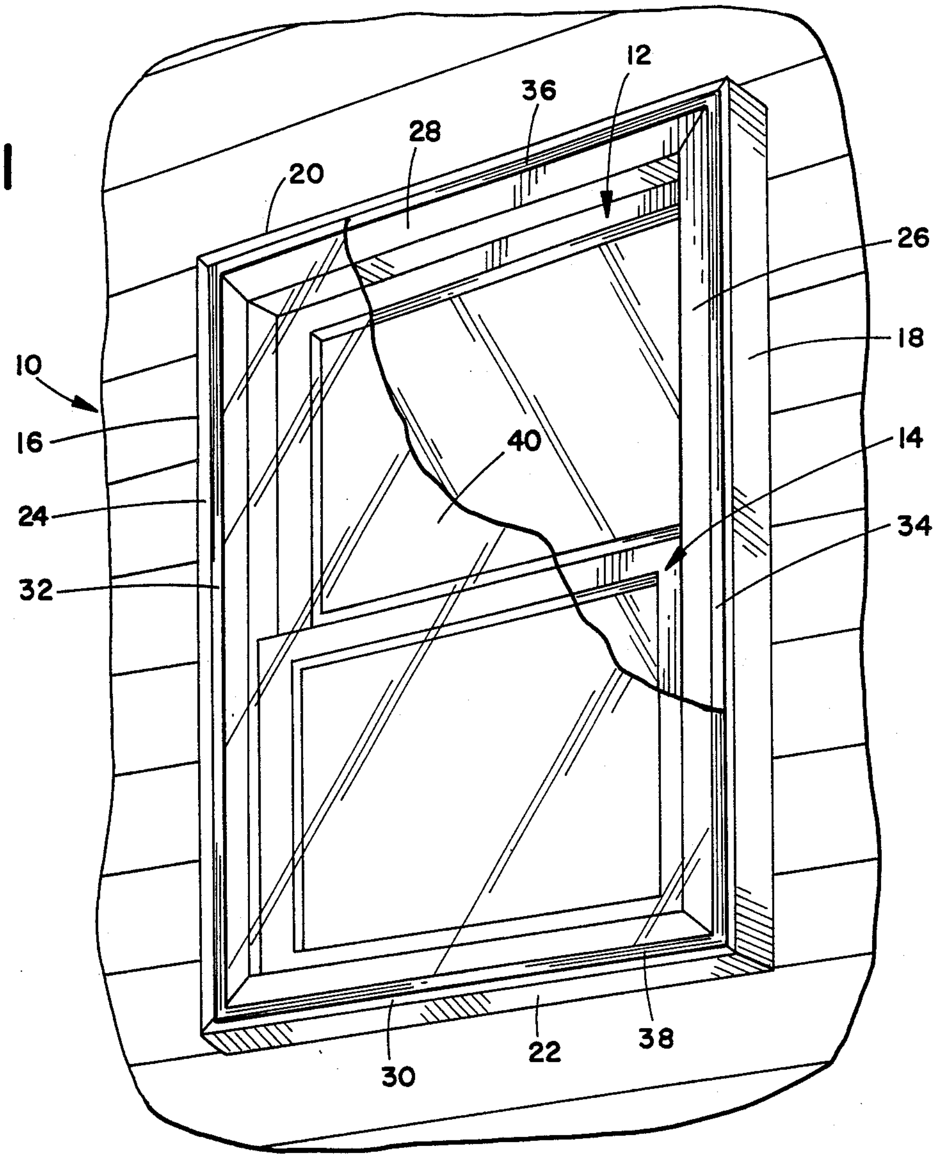
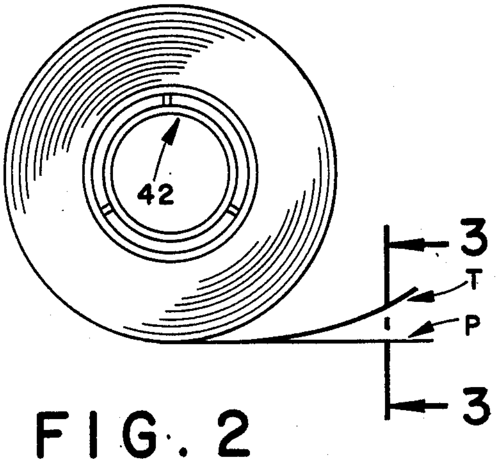
FIG. 2
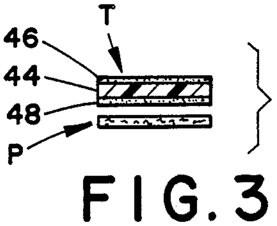
FIG. 3

EXTERIOR WEATHER BARRIER FOR WINDOWS AND DOORS

This is a continuation of Ser. No. 870,156 filed June 3, 1986, now abandoned.

BACKGROUND OF THE INVENTION

This invention relates to the art of weather barriers and, more particularly, to an installable and removable external weather barrier for an opening through a wall of a building and comprising thin plastic film adhesively mounted on external mounting surfaces surrounding the opening.

It is of course well known to provide weather barriers across openings such as those for doors and windows in homes or other buildings for purposes of eliminating drafts and conserving energy in connection with the internal heating of the building. Such weather barriers have included exteriorly mounted glass or plastic storm doors and windows which are convertible to provide screens to facilitate opening the interior of the building to outside air when desired. While such devices serve their intended purpose, they are expensive, cumbersome to use if they are the type which requires removal and replacement of glass panels and screens and, if of the self-storing type, often become difficult to operate with ease after a period of use and weathering which results in oxidation and/or scoring of the metal which impairs relative sliding movement therebetween.

As an alternative to such exterior weather barrier arrangements, or as a supplement thereto, a variety of internally mountable weather barriers have been proposed. One of the more recent of such interior arrangements is provided by mounting a double faced adhesive tape on a supporting surface such as the frame and sill of a window, adhering a heat shrinkable plastic film to the adhesive tape, and heating the film such as by use of a hair blow-dryer to shrink the film to a taut, wrinkle free condition. The shear strength of the adhesive tape is sufficient for the bond to be maintained between the film and tape and between the tape and mounting surface under the tensile force of the shrunk film and, at the end of the period of use of the barrier, the film and adhesive tape are pulled away from the mounting surface and discarded. Such an internal weather barrier is relatively inexpensive and easy to install and, because of relatively stable temperature and humidity conditions within a building, remains stable in its mounted condition throughout its period of use. Moreover, because of the internal mounting relative to window or door glass and the mounting of the adhesive tape on surfaces which most often are not exposed to direct sunlight, the plastic film and adhesive tape remain stable against the effects of ultraviolet light during the period of installation of the weather barrier.

While plastic film barriers of the foregoing character serve their intended weatherproofing purposes, the interior mounting of the film is considered by many to be unattractive and, while the adhesive tape is intended to be separable from the mounting surface after use without staining the latter or leaving any adhesive thereon, there is apprehension in this respect on the part of potential users. Other concerns of potential users include the fact that hardware for curtains, drapes, window shades or the like may have to be removed to facilitate mounting of the tape and plastic film and/or that such window or door accessories themselves would have to be removed or would not be accessible for opening and closing displacements thereof relative to a window or door in that they would be behind the plastic film.

Some homeowners, as an alternative to the foregoing weather barrier arrangements, have attempted to provide exterior weather barriers for doors and windows by positioning sheets of plastic material across the opening and suitably securing the plastic in place such as through the use of masking tape, staples, nails, tacks and the like. Such effort most often are basically unacceptable and ineffective for a number or reasons, including the damaging or marring of the mounting surfaces through the use of staples, nails and the like, and the inability of masking or other tapes or adhesives to maintain the plastic in place for an extended period of time when exposed to rain, wind, snow and gusting winds and variations in temperature from below freezing to as high as 100° F. Moreover the plastic materials used in connection with such efforts often are hazy, cannot be maintained with any degree of tautness under the varying weather conditions to which they are exposed, and often crack or tear in a relatively short period of time as a result of such exposure.

While it might appear obvious to at least attempt to avoid the foregoing disadvantages of exterior weather barriers and of an interior tape and heat shrink film type weather barrier by installing the latter on the exterior side of a building window or door, the tape and film materials will not perform satisfactorily under the weather conditions encountered, and the working conditions under which such an exterior system would have to be installed make it potentially dangerous for the person doing the installation and thus undesirable. More particularly in this respect, the heat shrink film, when installed and distended such as by the impact of rain and gusty winds thereon, will not over an extended period of such exposure return to its undistended taut condition. Thus, the film becomes unattractive in appearance and, through looseness, more subject to tearing or separation from the mounting surfaces in that winds whip the plastic and thus severely impact load the adhesive. Further, the shrink film and tape provided for interior barriers are adversely affected if used exteriorly by ultraviolet light and varying temperature and humidity conditions and, for these reasons too, subject the exterior installation to failure.

With respect to installing such a heat shrink system exteriorly, the exterior installation would require, at least in a majority of instances, the use of an ungrounded hair blow-dryer with an extension cod which would subject the installer to potentially dangerous electrical shock. Furthermore, the use of a blow-dryer in connection with an installation requiring the use of a ladder would necessitate the installer carrying the blow-dryer up the ladder together with the weather barrier materials to be installed, or would require the installer to undergo the inconvenience of installing the weather barrier materials and then descending and again ascending the ladder with the blow-dryer to shrink the film. Accordingly, considerable inconvenience as well as potential injury would accompany efforts to externally install such a shrink film system.

SUMMARY OF THE INVENTION

In accordance with the present invention, an external weather barrier is provided which minimizes or overcomes the disadvantages of both of the external weather barriers described above, and the internal heat shrink film type barrier described while maintaining the advantages of the latter, namely the economy and ease of installation, stability for a reasonable length of time, and the ease of removability and disposal without damaging the supporting surfaces on which the adhesive tape is mounted. More particularly, an exterior weather barrier according to the present invention is comprised of a double faced adhesive tape adhered to exterior mounting surfaces surrounding a building opening such as a window or door and having unique adhesive properties, and a sheet of hand stretchable plastic film material adhered in its stretched disposition to the exposed side of the mounted adhesive tape.

More particularly in accordance with the present invention, an exterior weather barrier system includes a double faced adhesive tape having one side adherable to the mounting surface surrounding the door or window and the other side adherable to the stretchable plastic film. The double faced adhesive has several characteristics which are important in connection with providing an external weather barrier system in accordance with the present invention. In this respect, the side of the adhesive tape which is adhered to the mounting surface must adhere thereto with sufficient tenacity not only to resist the tensile force of the plastic film when the latter has been stretched and firmly adhered to the other side of the tape, but also with sufficient tenacity to remain adhered to the mounting surface during repeated partial adhering and removal of the plastic film to the other side of the tape during installation of the film. Further, the adhesive to which the film is adhered must have sufficient tenacity to remain adhered thereto against the tensile force of the stretched film thereagainst and, further, must have such tenacity after repeated partial adhering and removing of the film from the adhesive during the installation procedure.

More particularly with regard to the installation procedure, since heat shrinking is not relied upon to remove wrinkles in the initially adhered plastic film and to obtain tautness thereof, it is necessary to lightly adhere the plastic film to the exposed side of the mounted adhesive tape and then to tightly stretch and properly position the film on all four sides of the opening by separating the film from portions of the adhesive tape, stretching the film and repositioning it against the tape until the desired wrinkle free tautness has been obtained. Several such removals and replacements of the film relative to the tape may be required during the installation procedure, and the adhesive on the side of the tape adhered to the mounting surface surrounding the window must not separate from the latter during such removals and replacements. Further, when the desired wrinkle free tautness has been achieved, the film is firmly pressed against the adhesive to which it is adhered, and the latter must then be able to maintain the film in the wrinkle free taut condition for the duration of use of the weather barrier.

Additionally, while the exterior mounting surface materials and/or the finishes thereon may correspond in general to those surrounding a window on the interior side of a building, the exterior mounting surfaces will not have a stable temperature, and the surface materials or finishes oxidize due to weathering. The adhesive on the mounting side of the double faced tape must be capable of initially adhering to the mounting surfaces over a wide temperature range, such as from about 40° F. to about 100° F. for example, and must also be capable o providing the foregoing restraint against separation both when initially adhered to such oxidized exterior mounting surfaces within the foregoing temperature range and throughout the duration of use of the barrier and at temperatures at least as low as 0° F. Still further, since the stretchable film and double faced adhesive tape are both on the exterior side of the window opening, they ar directly exposed to ultraviolet radiation from the sun and, accordingly, must be capable of resisting the effects of ultraviolet radiation so as to maintain the foregoing adhesion characteristics for the intended period of use of the external weather barrier.

The stretchable film must have sufficient memory to return to its wrinkle free, taut condition in response to distortion or distension thereof as a result of widely varying weather conditions to which the film is directly exposed including gusting winds and heavy and/or wind blown rain for example. More particularly, in an external weather barrier according to the present invention, the film will remain in a wrinkle free, taut condition, flexible and resistant to tearing and/or cracking, and adhesively bonded to the mounting surfaces surrounding a building opening for the intended duration of use and under expected adverse weather conditions including temperatures at least as low as 0° F. and as high as 100° F. In connection with removal of the weather barrier, the strength of the adhesive tape is such that when the adhesive tape is pulled away from the mounting surface the weather barrier is completely removed as a unit without leaving adhesive behind on the mounting surfaces.

Advantageously, the weather barrier materials, namely the hand stretchable film and double faced adhesive tape, can be provided in kit form to enable a homeowner or other do-it-yourself person to selectively purchase that quantity of materials necessary to install a given number as well as types of weather barriers as desired, such types being with reference to window or door barriers, for example. In this respect, the kit would, for example, be a package such as a paperboard box containing enough of the plastic film and enough tape, in roll form, to install a given number of window or door type weather barriers.

It is accordingly an outstanding object of the present invention to provide an exterior weather barrier for an opening in a building wall such as that provided for a window or door and comprised of a thin film of stretchable plastic material adhesively bonded to a mounting surface surrounding the opening.

Another object is the provision of a weather barrier of the foregoing character which optimizes convenience and safety in connection with the installation thereof.

A further object is the provision of a weather barrier of the foregoing character wherein the plastic film is hand stretchable and mountable across the opening through the use of a double faced adhesive adhered to the mounting surface surrounding the opening with sufficient tenacity to enable preliminary positioning, removing and repositioning of the plastic film thereagainst without separation of the tape from the mounting surface.

Still another object is the provision of a weather barrier of the foregoing character wherein the adherence of the adhesive tape to the mounting surface and to the plastic film is maintained against the tensile force of the stretched film thereagainst under varying adverse weather conditions under which the plastic film is distended or distorted including wind and rain and temperatures at least as low as 0° F. and in which the plastic film returns to a wrinkle free, taut condition following distortion or distension thereof.

Still another object is the provision of an exterior weather barrier of the foregoing character which can be installed over a wide range of temperatures of the mounting surfaces down to as low as about 40° F. and with respect to a variety of mounting surface materials, finishes and surface conditions and which, when installed, has stability and durability for a prolonged period of intended use under adverse and changing weather conditions including wind, rain, sun, snow and temperatures from at least as high as 100° F. to at least as low as 0° F.

Yet another object is the provision of an external weather barrier of the foregoing character which s in kit form providing sufficient film and double faced tape to facilitate the assembly of an external weather barrier or a number of weather barriers for a particular building opening or openings such as windows and/or doors.

BRIEF DESCRIPTION OF THE DRAWING

The foregoing objects, and others, will in part be obvious and in part pointed out more fully hereinafter in conjunction with the written description of a preferred embodiment of the invention illustrated in the accompanying drawing in which:

FIG. 1 is a perspective view of a building window provided with an exterior weather barrier in accordance with the present invention:

FIG. 2 is an elevation view of a roll of double faced adhesive tape for use in providing an external weather barrier in accordance with the present invention: and, FIG. 3 is an enlarged cross-sectional elevation view of the adhesive tape taken along line 3—3 in FIG. 2.

DESCRIPTION OF A PREFERRED EMBODIMENT

Referring now in greater detail to the drawings wherein the showings are for the purpose of illustrating a preferred embodiment of the invention only, and not for the purpose of limiting the invention, FIG. 1 illustrates a building wall 10 having an opening therethrough closed by a window comprised of vertically slidable upper and lower sashes 12 and 14, respectively. The window opening is bounded exteriorly of wall 10 by window molding comprised of laterally spaced apart vertical side members 16 and 18 and horizontally extending upper and lower members 20 and 22, respectively, between the side members. In the embodiment illustrated, window molding member 16, 18, 20 and 22 have vertically extending coplanar outer surfaces 24, 26, 28 and 30 respectively. The window molding can for example be wood, plastic or metal, and outer surfaces 24, 26, 28 and 30 can be defined, for example, by stain, varnish, paint or plastic cladding if the molding substrate is wood, by clean smooth metal, anodized aluminum, paint or plastic cladding if the molding member is of metal, painted and unpainted plastics when the latter provide the molding members, and any other smooth, non-porous surface to which the double faced adhesive to be described hereinafter will adhere to facilitate providing an external weather barrier in accordance with the present invention.

An external weather barrier for the window defined by sashes 12 and 14 includes strips of double faced adhesive tape 32, 34, 36 and 38 adhered respectively to outer surfaces 24, 26, 28 and 30 of the window molding members, and a sheet of transparent, hand stretchable plastic film 40 overlying and adhered to the adhesive tape strips. As will be appreciated from FIG. 2, strips 32, 34, 36 and 38 are preferably cut from a roll of tape comprising a suitable support 42 on which a continuous length of double faced tape T is wound together with a release paper strip P. Release paper P is disposed against the adhesive on the radially outer side of the convolutions on support 42 and, as is well known, separates the otherwise facially opposed layers of adhesive and has minimal adherence to each of the layers, thus enabling the winding and unwinding of the tape from support 42. In connection with providing an external weather barrier in accordance with the present invention, release paper P facilitates the mounting of the strips of tape on the window molding member surfaces, as set forth hereinafter.

In accordance with the present invention, and as will be seen from FIG. 3, tape T comprises an adhesive carrier or support member 44 which, with respect to winding of the tape and release paper on support 42, is provided on the radially inner side thereof with a layer of adhesive 46. Layer 46 provides the mounting side by which the adhesive tape T is adhered to the window molding, and tape T further includes a layer of adhesive 4 on the radially outer side of carrier 44 and by which the stretchable film 40 is adhered to the tape and thus to the window molding.

In connection with installing an exterior weather barrier according to the present invention, lengths of tape T with release paper P adhered to adhesive layer 48 are unwound and cut from support 42 and in appropriate lengths to provide strips 32, 34, 36 and 38. The strips are mounted on the corresponding one of the mounting surfaces 24, 26, 28 and 30 of the window molding by positioning adhesive layer 46 thereagainst and firmly pressing release paper P in the direction of the mounting surface and along the length of the tape strip. Either after each of the tape strips is so mounted, or after all of the strips are mounted on the window molding, release paper P is peeled away to expose adhesive layer 88. Stretchable plastic film 40 is then adhered to the exposed adhesive layer 48 on the tape strips, in the manner set forth hereinafter, to complete the installation.

While not shown, for purposes of clarity, the sheet of stretchable plastic film 40 initially has width and length dimensions providing for the film to extend about two inches beyond the laterally outer edge of each of the four tape strips to facilitate the positioning and repositioning of the film relative to the tape strips during installation of the film. More particularly in this respect, and as one example of a sequence of manipulation of the plastic film to install the latter, the upper edge of the plastic film is lightly pressed against the exposed adhesive layer 88 on tape strip 36 on top window molding member 20, and the film is stretched downwardly to a taut condition and lightly pressed against adhesive layer 48 on adhesive strip 38 on bottom window molding member 22 and adjacent the laterally outer corners of the tape. Then, working from top to bottom, the film is stretched laterally outwardly and lightly pressed against adhesive layers 48 on the side tape strips 32 and 34. In connection with all of the foregoing stretching of film 40 and light application thereof against the layers of adhesive 48 on the tape strips, the film or selected portions thereof can be pulled away from the tape strips and repositioned relative thereto without pulling the tape strips away from the mounting surfaces provided therefore by the window molding members. Thus, the plastic film can be so manipulated repeatedly and as needed until a taut, wrinkle free disposition thereof is achieved. Once the film is in such a taut, wrinkle free disposition, the film is firmly adhered to adhesive layers 48 of the tape strips by firmly pressing the film thereagainst in the direction of the corresponding mounting member and along the length of the tape strips.

The ability to repeatedly remove, reposition and replace stretchable film 40 in connection with the installation thereof and without separating the tape strips from the mounting surfaces to which they are applied is essential in accordance with the present invention in that nothing further is relied upon in connection with installation of the film to achieve a taut, wrinkle free disposition thereof. Such a disposition of the film is necessary for purposes of appearance of the weather barrier, to optimize undistorted visibility therethrough from inside the building, and to restrain billowing of the film once installed. The stretchable film has a plastic memory which tends to return the film to its unstretched condition whereby it will be appreciated that, when the film is stretched and adhered to the adhesive tape strips, tensile forces in the film as a result of such memory impose laterally directed shear forces on the adhesive layers 46 and 48 relative to the tape mounting surfaces, the plastic film and carrier member 44 between the adhesive layers. Accordingly, it will be appreciated that the pressure sensitive adhesives providing layers 46 and 48 must have shear strengths respectively to restrain separation of the tape strip from the corresponding support surface provided by the window molding and to prevent separation of plastic film 40 from the tape strip when the plastic film is stretched and adhered thereto. It will be appreciated with regard to adhesive layer 46 in particular that the shear strength thereof must be sufficient to accommodate such tensile forces imposed by film 40 without separation of the tape from the wide variety of exterior mounting surfaces and surface conditions identified hereinbefore. Moreover, it will be appreciated that the exterior weather barrier thus provided is exposed to widely varying weather conditions including wind, rain, temperatures ranging from at least as low as 0° F. to possibly 100° F., direct sunlight, and various combinations of such conditions, whereby both plastic film 40 and tape T must be capable of maintaining the foregoing adhesion characteristics thereof under such varying conditions and for the intended duration of use of the weather barrier which, most often, is about six months. In connection with the stretchable plastic film, the latter will be distended and/or distorted as a result of the impingement of wind and rain thereagainst and must be capable of accommodating such distensions and/or distortions without cracking or tearing and, following such, must return to its taut disposition. Moreover, it will be appreciated that during distensions of the stretched plastic film the tensile forces therein and thus the shearing forces on the adhesive layers of the tape vary whereby the shear strengths of the adhesives providing layers 46 and 48 must accommodate such varying forces.

It will also be appreciated that the exterior weather barrier is directly exposed to ultraviolet radiation, whereby the stretchable plastic film, carrier 44 and the adhesive materials of layers 46 and 48 must be resistant to ultraviolet radiation. Further, the weather barrier and thus the film and adhesive must be installable over a wide range of temperatures from at least as low as 40° F. to as high as 100° F. Finally, removal of the weather barrier at the end of the period of use thereof, usually a minimum of six months, preferably is achieved in a manner which provides for the film and tape strips to be pulled away from the mounting surfaces in one complete unit. This is achieved by manually pulling the mounting tape strip forwardly of the mounting surfaces.

In connection with the preferred embodiment described hereinabove, stretchable plastic film 40 has a gauge or thickness of between 0.0006 inch to 0.0015 inch and, preferably, is 0.0010 inch thick, and has a tensile strength of from about 3500 grams per inch to about 7000 grams per inch. Further, the stretchable film is preferably a transparent, biaxially oriented, linear, single layer, low density plastic film, preferably a polyolefin film, and such a stretchable polyolefin film providing the foregoing desired characteristics in accordance with the present invention is available from the Polymer Products Departmnt of DuPont, Wilmington, Del. under the latter's product designation XEH-F918. Further in accordance with the preferred embodiment, adhesive tape T has a total thickness between about 0.022 inch to 0.004 inch and, preferably, about 0.003 inch, and the carrier has a thickness of from about 0.0005 inch to about 0.0015 inch and, preferably about 0.001 inch. Adhesive layers 46 and 48 can be of equal thickness although layer 46 is preferably slightly thicker than layer 48 to accommodate unevenness along the mounting surface. Preferably, carrier 44 is a transparent polyester film and pressure sensitive adhesive layer 46 is defined by a synthetic, saturated rubber adhesive adherable to the variety of potential mounting surfaces set forth herein and at the installation temperatures set forth herein. The pressure sensitive adhesive of layer 48 is preferably a synthetic block copolymer readily adherable to low energy films of materials such as polyethylene, polypropolene, polyvinyl chloride, vinyl sheeting and a variety of polyolefin surfaces. Further in connection with providing the adhesion characteristics described with respect to the mounting of tape T and film 40, the adhesive of layer 46 has a peel adhesion strength from a minimum of about 40 ounces per inch up to about 80 ounces per inch, and the adhesive of layer 48 has shear strength from a minimum of about 80 ounces per inch up to about 120 ounces per inch. A double faced adhesive tape having adhesives of the foregoing character and providing the desired characteristics set forth herein with respect to the exterior weather barrier according to the present invention is available from Adhesive Research Corporation of Glen Rock, Pa. under the latter's product designation X5401.

While considerable emphasis has been placed herein on the preferred embodiment illustrated and described, it will be appreciated that other embodiments of the invention can be made and that changes can be made in the preferred embodiment without departing from the principals of the present invention. Accordingly, it is to be distinctly understood that the foregoing descriptive matter is to be interpreted merely as illustrative of the invention and not as a limitation.

Having thus described the invention, it is claimed:

1. An exterior weather barrier for an opening through a building wall and which opening is bounded exteriorly of the building by exposed mounting surface means, said weather barrier including adhesive tape means resistant to ultraviolet radiation and comprising adhesive carrier means having opposite sides, a first pressure sensitive adhesive on one of said sides for adhering said tape means to said mounting surface means about said opening and a second pressure sensitive adhesive on the other of said sides and facing away from said mounting surface means when said tape means is adhered to said mounting surface means, and said weather barrier further including stretchable plastic film means of sufficient surface area to cover said opening and overlie and adhere, in an initial stretched, taut, wrinkle-free condition, to said second adhesive on said tape means, said film means being resistant to ultraviolet radiation and having a plastic memory acting to constantly return said adhered film means to said initial stretched, taut, wrinkle-free condition from further stretched and distended conditions thereof caused by adverse outdoor weather conditions, said first adhesive having a peel adhesion strength of at least about forty ounces per inch, said second adhesive having a peel adhesion strength of at least about twice the peel adhesive strength of said first adhesive, said film means and said first and second adhesives being mountable on said mounting surface means at a temperature of the latter of from about 40° F. to about 100° F., said plastic film means being flexible and crack and tear resistant at a temperature at least as low as 0° F., and said first and second adhesives providing adherence without separation from the corresponding one of said mounting surface means and film means at a temperature at least as low as 0° F.

2. A weather barrier according to claim 1, wherein said first adhesive will adhere with said peel adhesion strength thereof to mounting surfaces including weather oxidized surfaces of painted, stained and varnished woods, painted and unpainted metals, anodized aluminum, plastics and plastic clad materials.

3. A weather barrier according to claim 1, wherein said first adhesive has a peel adhesion strength of from about 40 to about 80 ounces per inch.

4. A weather barrier according to claim 1, wherein said second adhesive has a peel adhesion strength of from about 80 to about 120 ounces per inch.

5. A weather barrier according to claim 1, wherein said plastic film is a biaxially oriented low density polyolefin.

6. A weather barrier according to claim 1, wherein said plastic film has a thickness of from about 0.0006 inch to about 0.0015 inch nd a tensile strength of from about 3500 grams per inch to about 7000 grams per inch.

7. A weather barrier according to claim 1, wherein said adhesive tape means has a thickness of from about 0.002 inch to about 0.004 inch between the outer sides of said first and second adhesives, and said carrier means has a thickness of from about 0.0005 inch to about 0.0015 inch.

8. A weather barrier according to claim 7, wherein said first adhesive has a greater thickness than said second adhesive.

9. A weather barrier according to claim 1, wherein said first adhesive will adhere with said peel adhesion strength thereof to mounting surfaces including weather oxidized surfaces of painted, stained and varnished woods, painted and unpainted metals, anodized aluminum, plastics and plastic clad materials, and said first adhesive having a peel adhesion strength from about 40 to about 80 ounces per inch.

10. A weather barrier according to claim 9, wherein said second adhesive has a peel adhesion strength of from about 80 to about 120 ounces per inch.

11. A weather barrier according to claim 10, wherein said plastic film is a biaxially oriented low density polyolefin, said plastic film has a thickness of from about 0.0006 inch to about 0.0015 inch and a tensile strength of from about 3500 grams per inch to about 7000 grams per inch.

12. A weather barrier according to claim 11, wherein said adhesive tape means has a thickness of from about 0.002 inch to about 0.004 inch between the outer sides of said first and second adhesives, and said carrier means has a thickness of from about 0 005 inch to about 0.0015 inch.

13. A weather barrier according to claim 1, wherein said first adhesive has a peel adhesion strength of from about 40 to about 80 ounces per inch, and said second adhesive has a peel adhesion strength of from about 80 to about 120 ounces per inch.

14. A weather barrier according to claim 13, wherein said plastic film is a biaxially oriented low density polyolefin, said plastic film has a thickness of from about 0.0006 inch to about 0.0015 inch and a tensile strength of from about 3500 grams per inch to about 7000 grams per inch.

15. A weather barrier according to claim 14, wherein said adhesive tape means has a thickness of from about 0.002 inch to about 0.004 inch between the outer sides of said first and second adhesives, and said carrier means has a thickness of from about 0.0005 inch to about 0.0015 inch.

16. A weather barrier according to claim 1, wherein said plastic film is a biaxially oriented low density polyolefin, and said plastic film has a thickness of from about 0.0006 inch to about 0.0015 inch and a tensile strength of from about 3500 grams per inch to about 7000 grams per inch.

17. A weather barrier according to claim 16, wherein said first adhesive will adhere with said peel adhesion strength thereof to mounting surfaces including weather oxidized surfaces of painted, stained and varnished woods, painted and unpainted metals, anodized aluminum, plastics and plastic clad materials.

18. A weather barrier according to claim 17, wherein said adhesive tape means has a thickness of from about 0.002 inch to about 0.004 inch between the outer sides of said first and second adhesives, and said carrier means has a thickness of from about 0.0005 inch to about 0.0015 inch.

19. A weather barrier according to claim 18, wherein said plastic film has a thickness of about 0.001 inch and said adhesive tape has a thickness of about 0.003 inch.

20. A weather barrier according to claim 19, wherein said first adhesive has a peel adhesion strength of from about 40 to about 80 ounces per inch, and said second adhesive has a peel adhesion strength of from about 80 to about 120 ounces per inch.

21. A weather barrier according to claim 1, wherein the resistance of said plastic film means to stretch is lower than the shear strength of the bondings of said plastic film means to said mounting surface means by said adhesive tape means.

22. A packaged kit for installing an exterior weather barrier across an opening through a building wall and which opening is bounded exteriorly of the building wall by exposed mounting surfaces, said kit including a sheet of stretchable plastic film resistant to ultraviolet radiation and having a surface area sufficient to cover said opening and overlie said mounting surfaces, said film having a thickness of from about 0.0006 inch to about 0.0015 inch and a tensile strength of from about 3500 to about 7000 grams per inch and being flexible and tear resistant at a temperature at least as low as 0° F., and a roll of double faced adhesive tape resistant to ultraviolet radiation and having a length sufficient to provide strips of adhesive tape on said mounting surfaces and bounding said opening, said adhesive tape comprising an adhesive carrier having opposite sides, a fist adhesive on one side of said carrier for adhering said tape strips to said mounting surfaces, a second adhesive on the other side of said carrier for adhering said film to said tape strips, said tape on said roll having release paper covering said second adhesive, said first and second adhesives being adherable to the corresponding one of said mounting surfaces and plastic film at an installation temperature of from about 40° F. to about 100° F. and each of said adhesives having a shear strength to maintain such adhesion at a temperature at least as low as 0° F., the peel adhesion strength of said first adhesive being at least about 40 ounces per inch, and the peel adhesion strength of said second adhesive being at least about 80 ounces per inch, said stretchable plastic film adapted to be adhered, in an initial stretched, taut, wrinkle-free condition covering said opening, to said second adhesive on said adhesive tape adhered to the said mounting surfaces bounding said opening, and said stretchable plastic film having a plastic memory acting to constantly return said adhered plastic film to said initial stretched, taut, wrinkle-free condition from further stretched and distended conditions thereof caused by adverse weather conditions.

* * * * *